United States Patent
Kawasaki

(10) Patent No.: US 9,698,952 B2
(45) Date of Patent: *Jul. 4, 2017

(54) COMMUNICATIONS SYSTEM, WIRELESS BASE STATION, WIRELESS TERMINAL, AND COMMUNICATIONS METHOD

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,648

(22) Filed: Feb. 6, 2015

(65) Prior Publication Data

US 2015/0180620 A1  Jun. 25, 2015

Related U.S. Application Data

(63) Continuation of application No. PCT/JP2012/070774, filed on Aug. 15, 2012.

(51) Int. Cl.
H04W 48/16 (2009.01)
H04L 5/00 (2006.01)
H04J 11/00 (2006.01)

(52) U.S. Cl.
CPC ............ *H04L 5/005* (2013.01); *H04J 11/005* (2013.01); *H04L 5/0051* (2013.01);
(Continued)

(58) Field of Classification Search
None
See application file for complete search history.

(56) References Cited

U.S. PATENT DOCUMENTS

2009/0046694 A1  2/2009  Matsumoto et al.
2009/0203377 A1  8/2009  Kawasaki
(Continued)

FOREIGN PATENT DOCUMENTS

CN  101300766 A  11/2008
CN  101924589 A  12/2010
(Continued)

OTHER PUBLICATIONS

Fujitsu, "UE-specific Search Space Design Principles for ePDCCH", Agenda Item: 7.6.3, 3GPP TSG RAN WG1 Meeting #70, R1-123304, Qingdao, China, Aug. 13-17, 2012, URL: <http://www.3gpp.org/ftp/tsg_ran/WG1_RL1/TSGR1_70/Docs/> (retrieved Nov. 11, 2015).
(Continued)

*Primary Examiner* — Awet Haile
(74) *Attorney, Agent, or Firm* — Myers Wolin, LLC

(57) ABSTRACT

A communications system in which, in each cell, a common reference signal to wireless terminals of the cell is transmitted at a first timing at a frequency that is based on identification information of the cell, and the communications system includes a wireless base station that transmits the common reference signal at the first timing, and transmits at a second timing that is different from the first timing, a wireless-terminal-specific reference signal to the wireless terminals of the cell of the wireless base station and a control signal to the wireless terminals of the cell of the wireless base station, concurrently at different frequencies; and a wireless terminal that based on the wireless-terminal-specific reference signal transmitted by the wireless base station, demodulates the control signal transmitted by the wireless base station.

12 Claims, 11 Drawing Sheets

(52) U.S. Cl.
CPC .......... *H04L 5/0053* (2013.01); *H04L 5/0007* (2013.01); *H04W 48/16* (2013.01)

(56) References Cited

U.S. PATENT DOCUMENTS

| | | | |
|---|---|---|---|
| 2010/0309863 | A1 | 12/2010 | Sangiamwong et al. |
| 2011/0085506 | A1 | 4/2011 | Lee et al. |
| 2011/0317624 | A1* | 12/2011 | Luo ...................... H04W 72/14 370/328 |
| 2012/0115485 | A1* | 5/2012 | Narasimha ............ H04W 68/02 455/437 |
| 2013/0039284 | A1* | 2/2013 | Marinier ................. H04L 5/001 370/329 |
| 2013/0039291 | A1* | 2/2013 | Blankenship ........... H04L 5/001 370/329 |
| 2013/0058296 | A1 | 3/2013 | Jitsukawa |
| 2013/0331138 | A1* | 12/2013 | Kim ...................... H04W 48/12 455/509 |
| 2014/0211730 | A1 | 7/2014 | Seo et al. |

FOREIGN PATENT DOCUMENTS

| | | |
|---|---|---|
| JP | 2014-023108 A | 2/2014 |
| JP | 2014-529940 A | 11/2014 |
| WO | 2007/052767 A1 | 5/2007 |
| WO | 2008/050428 A1 | 5/2008 |
| WO | 2011/135614 A1 | 11/2011 |
| WO | 2012/070839 A2 | 5/2012 |
| WO | 2013/024967 A2 | 2/2013 |

OTHER PUBLICATIONS

Catt, "Considerations on multiplexing of different DCIs", Agenda Item: 7.6.4, 3GPP TSG RAN WG1 Meeting #68, R1-120112, Dresden, Germany, Feb. 6-10, 2012.

Office Action issued for corresponding Japanese Patent Application No. 2014-530419 issued on Nov. 24, 2015 with a partial English translation.

Fujitsu, "UE-specific Search Space Design Principles for ePDCCH", Agenda Item: 7.6.3, 3GPP TSG RAN WG1 Meeting #70, R1-123304, Qingdao, China, Aug. 13-17, 2012.

HTC, "RE mapping for ePDCCH", Agenda Item: 7.6.1, 3GPP TSG-RAN WG1 Meeting #70, R1-123862, Qingdao, China, Aug. 13-17, 2012.

International Search Report issued for corresponding International Patent Application No. PCT/JP2012/070774, mailed on Sep. 11, 2012.

International Preliminary Report on Patentability issued for corresponding International Patent Application No. PCT/JP2012/070774, mailed on Sep. 11, 2012, with partial English translation.

Office Action issued for corresponding Japan Patent Application No. 2014-530419 issued on Mar. 15, 2016 with a partial English translation.

ZTE, "Discussion on DM-RS based enhanced PDCCH transmission", Agenda Item: 7.6.2, R1-122102, 3GPP TSG RAN WG1 Meeting #69, 3rd Generation Partnership Project (3GPP), Prague, Czech Republic, May 21-25, 2012.

Dahlman et al., "4G LTE/LTE-Advanced for Mobile Broadband—Chapter 10: Downlink Physical-Layer Processing", pp. 143-202, Academic Press (Elsevier Ltd.), Mar. 29, 2011.

Partial supplementary European search report issued for corresponding European Patent Application 12891346.4 dated Aug. 19, 2015.

Extended European search report with the supplementary European search report and the European search opinion issued for corresponding European Patent Application No. 12891346.4 issued Dec. 7, 2015.

Non-Final Office Action issued by the United States Patent and Trademark Office for corresponding U.S. Appl. No. 14/982,596 electronically delivered on Apr. 15, 2016.

Final Office Action issued by the United States Patent and Trademark Office for corresponding U.S. Appl. No. 14/982,596, electronically delivered on Aug. 4, 2016.

Office Action issued for corresponding Japan Patent Application No. 2014-530419 issued on Jul. 13, 2016 with a partial English translation.

Non-Final Office Action issued by the United States Patent and Trademark Office for corresponding U.S. Appl. No. 14/982,596, electronically delivered on Nov. 2, 2016.

First Notification of Office Action issued by the State Intellectual Property Office of China for corresponding Chinese Patent Application No. 201280075291.X, dated Feb. 27, 2017, with an English translation.

Office Action issued by the Japan Patent Office for corresponding Japanese Patent Application No. 2014-530419, mailed on Apr. 25, 2017, with an English translation.

3GPP TS 36.211 V10.5.0, "3rd Generation Partnership Project; Technical Specification Group Radio Access Network; Evolved Universal Terrestrial Radio Access (E-UTRA); Physical Channels and Modulation (Release 10)", Jun. 2012.

* cited by examiner

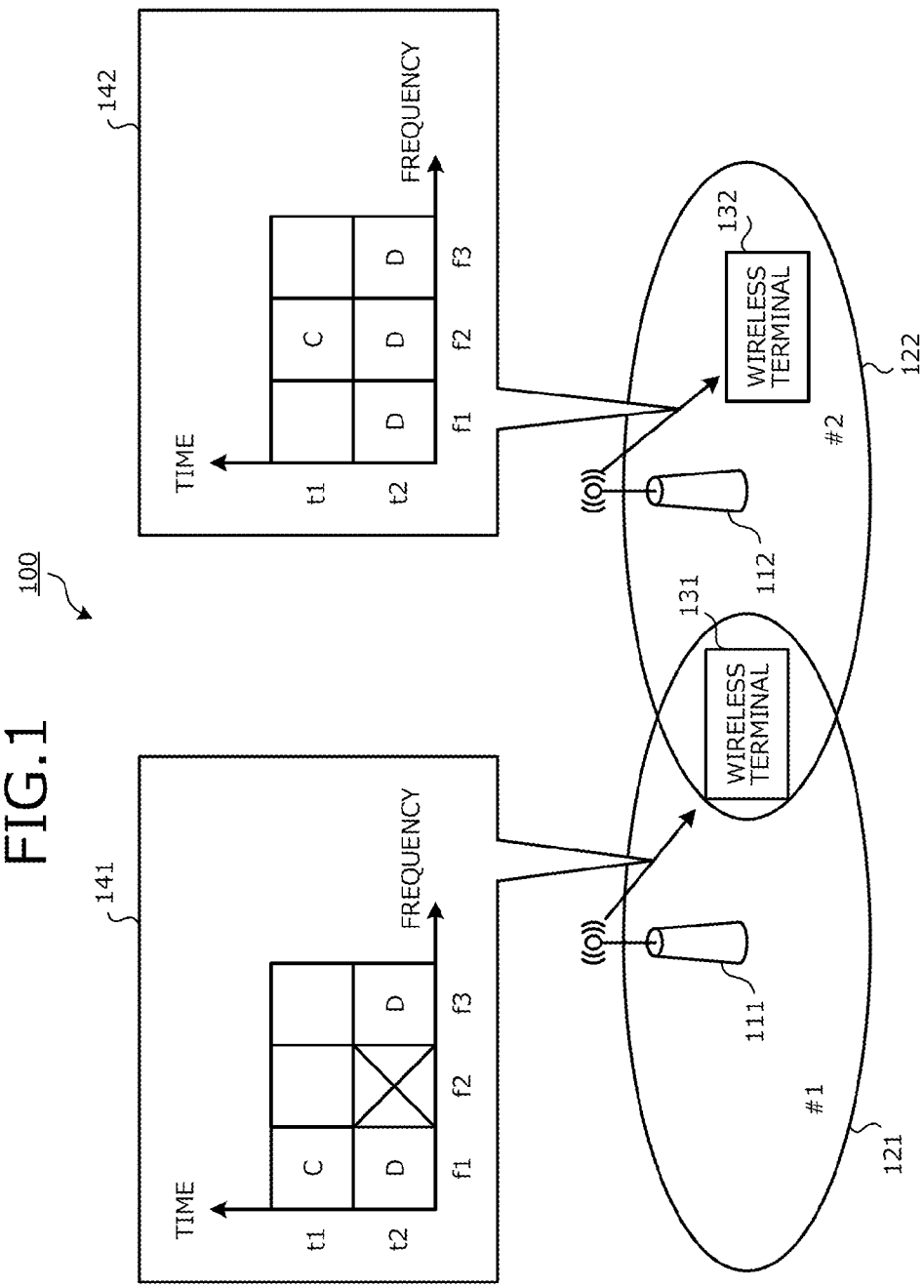

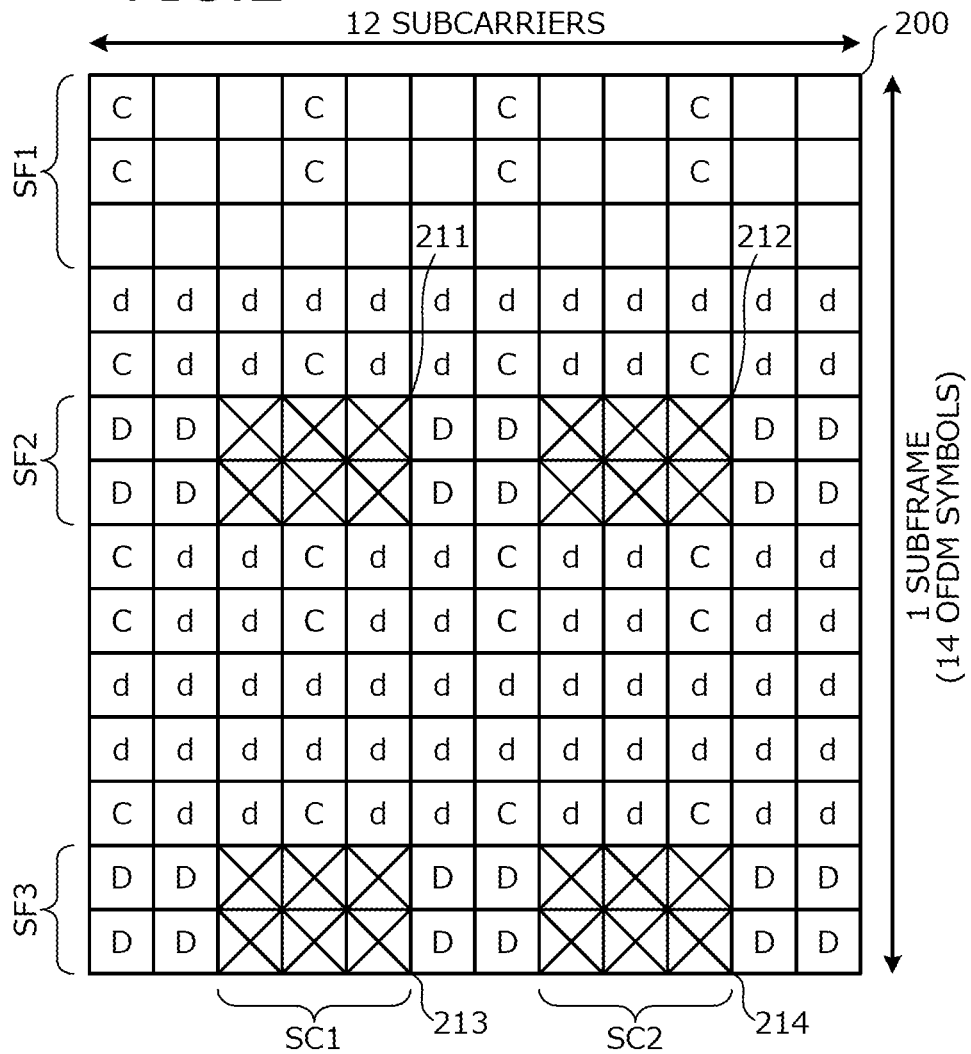

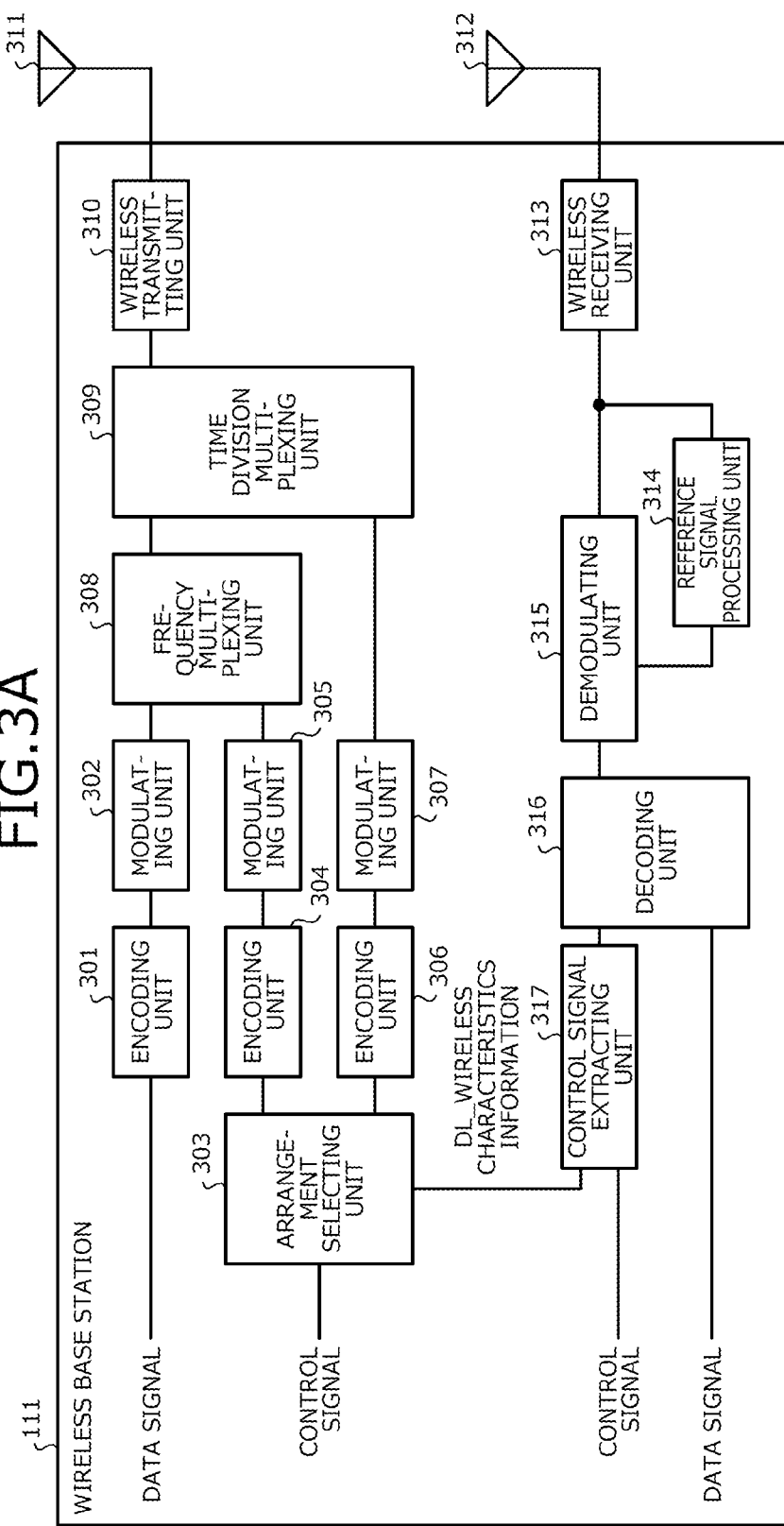

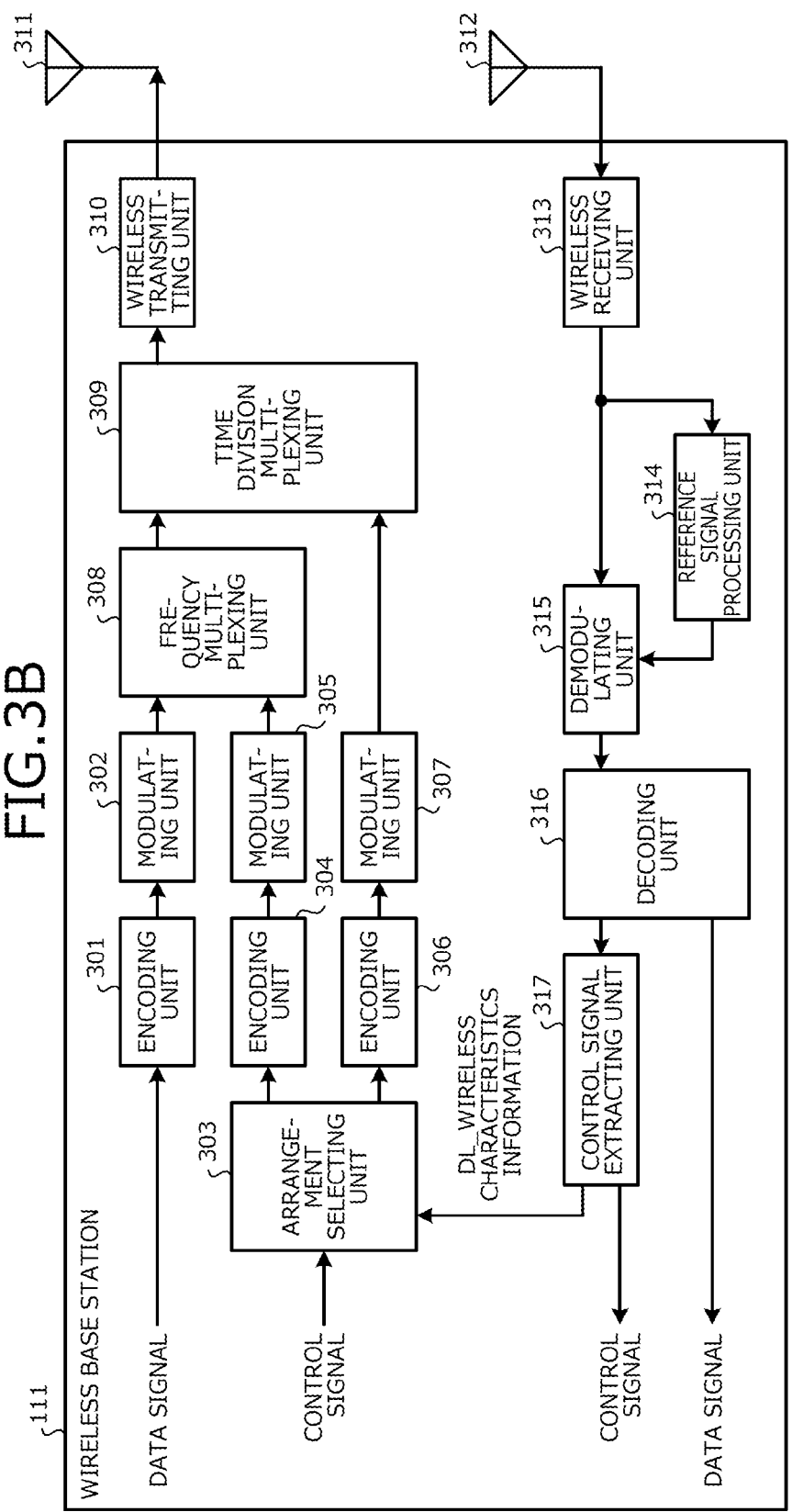

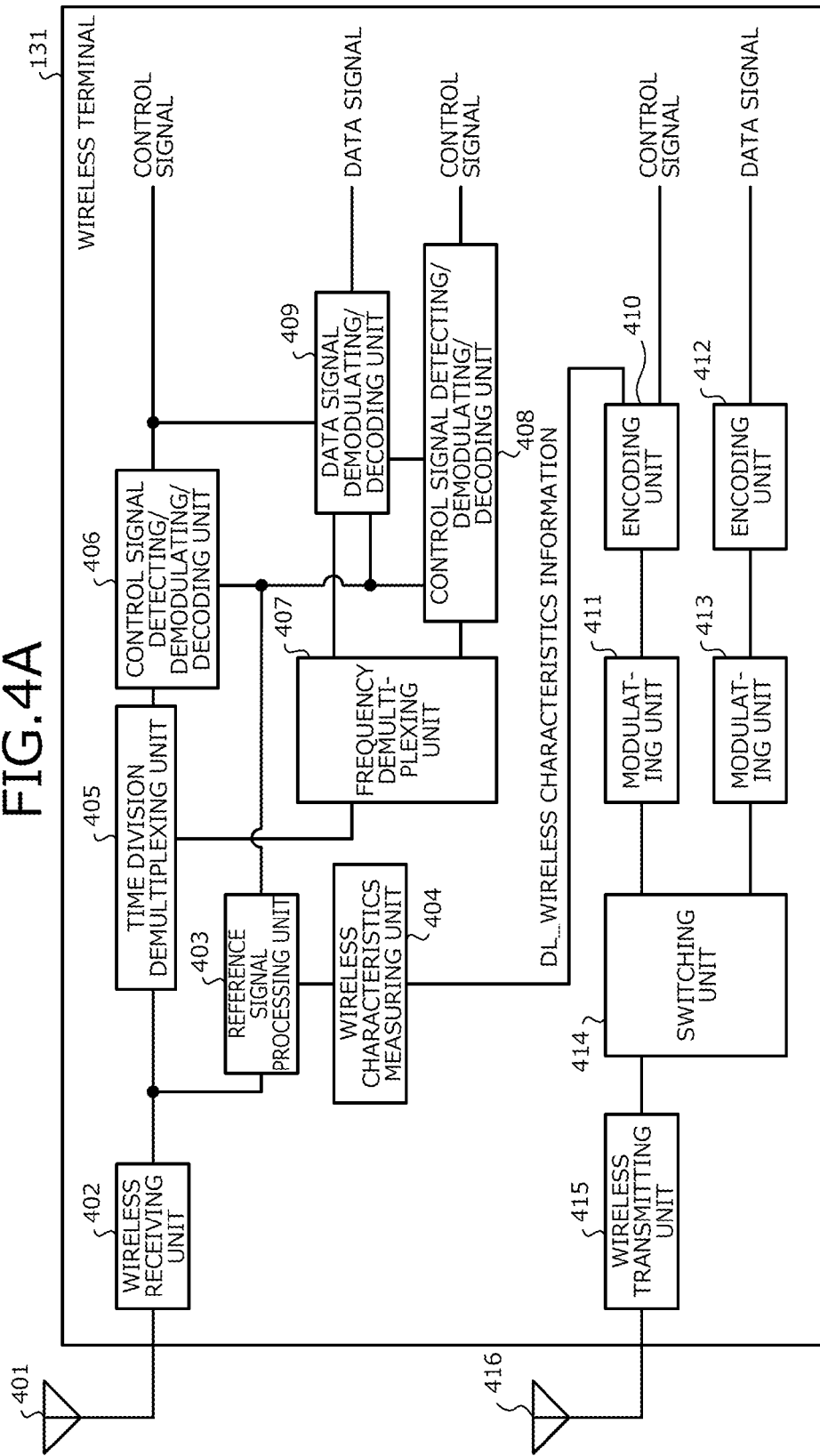

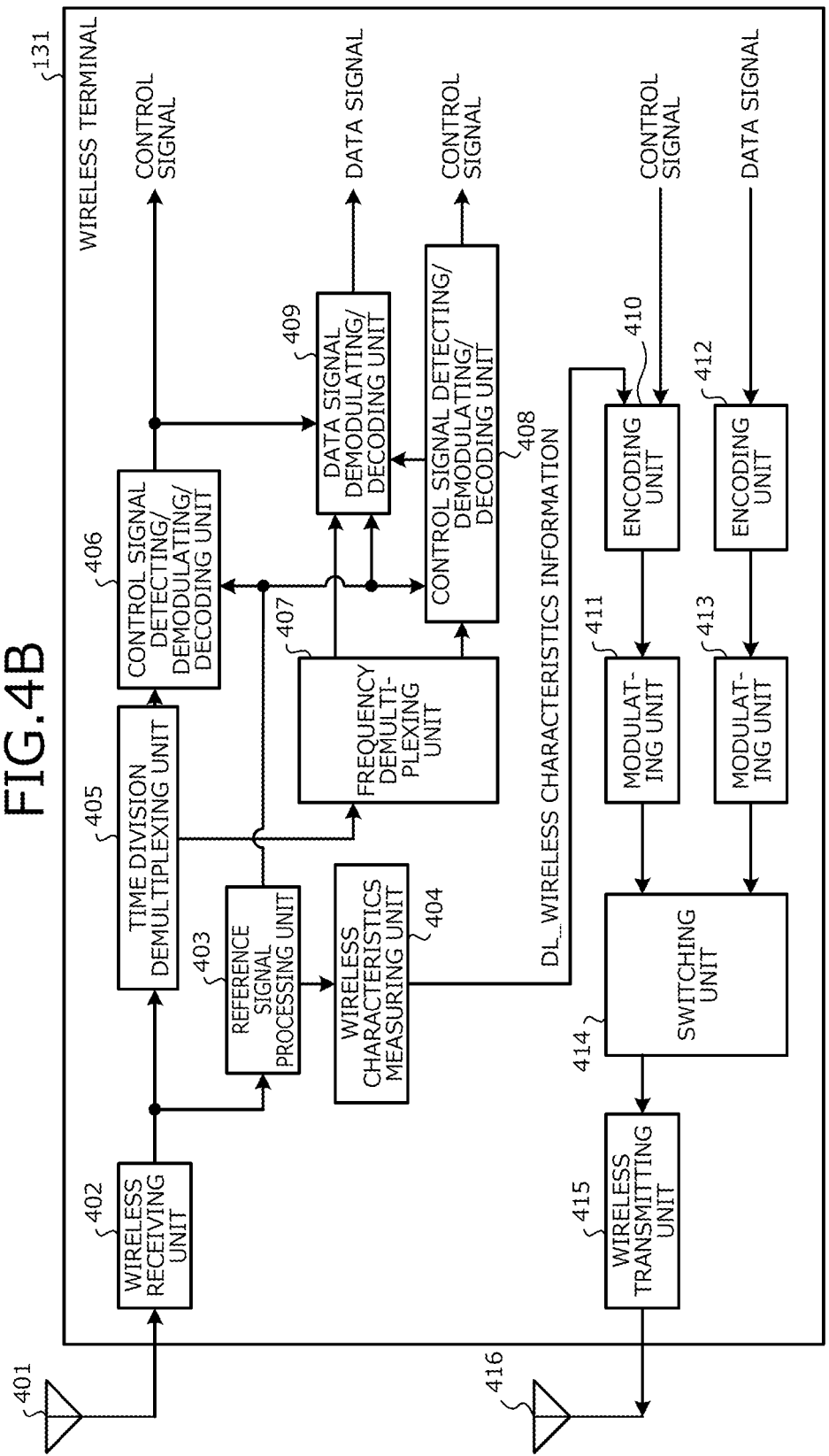

COMMUNICATIONS SYSTEM, WIRELESS BASE STATION, WIRELESS TERMINAL, AND COMMUNICATIONS METHOD

CROSS REFERENCE TO RELATED APPLICATIONS

This application is a continuation application of International Application PCT/JP2012/070774, filed on Aug. 15, 2012 and designating the U.S., the entire contents of which are incorporated herein by reference.

FIELD

The embodiment discussed herein is related to a communications system, a wireless base station, a wireless terminal, and a communications method.

BACKGROUND

The 3rd Generation Partnership Project (3GPP), a standard-setting organization that develops specifications for wireless communications systems, is studying and developing Long Term Evolution-Advanced (LTE-Advanced), which is an advancement of LTE, a mobile communications system. Although work for specifying basic functions of LTE-A has been completed, with an aim to further improve performance and improve the capacity to handle diversified system operation scenarios, the introduction of new functions has been proposed, discussion continues, and the system continues to advance. Under the LTE-A specifications thus far, a wireless control signal for transmitting radio parameters (the position of the frequency domain, the modulation scheme, the code rate, etc. for a data signal) directly related to the wireless transmission of a data signal that is to be transmitted, has been transmitted at a time domain that differs from that of the data signal. In other words, the radio resource domain used in the transmission of the wireless control signal and the radio resource domain used in the transmission of a data signal have been time-division multiplexed. The latest discussions study a way to also map wireless control signals in the domain used for the transmission of data signals to enable the amount of radio resources that can be used in the transmission of a wireless control signal to be increased as circumstances demand. Nonetheless, if a portion of the domain for the transmission of data signals are made available for the transmission of wireless control signals as well, the amount of radio resources that can be used for data signal transmission decreases. Therefore, the use of a highly efficient transmission method and a minimal amount of radio resources is desirable for wireless control signals that are to be transmitted on the domain used for data signal transmission. One such known method is the application of a modulation scheme of a high-order modulation degree to the wireless signals and in which a high-order modulation scheme is applied to downlink control signals in a vicinity of a reference signal (for example, refer to Published Japanese-Translation of PCT Application, Publication No. 2007/052767). In the reception and demodulation of a wireless signal to which a high-order modulation scheme of using not only 16 QAM, 64 QAM, etc. phase components but also amplitude components and mapping information bits is applied, demodulation characteristics have to be enhanced. Normally, the demodulation characteristics of signals in the vicinity of a reference signal improves when data signal demodulation is performed by interpolating channel estimation results for multiple reference signals to obtain channel estimation information for demodulating data signals.

Nonetheless, for example, as with LTE and LTE-A, if the transmission frequency of a common reference signal among wireless cells is shifted, even if a wireless control signal to which a modulation scheme of a high-order modulation degree is applied is in the vicinity of the reference signal, reception characteristics of the control signal may deteriorate consequent to interference from the common reference signal of an adjacent cell, and the benefit of improved demodulation characteristics by placing in the vicinity of a reference signal, a signal that is to be demodulated cannot be sufficiently obtained.

SUMMARY

According to an aspect of an embodiment, a communications system in which, in each cell, a common reference signal to wireless terminals of the cell is transmitted at a first timing at a frequency that is based on identification information of the cell, and the communications system includes a wireless base station that transmits the common reference signal at the first timing, and transmits at a second timing that is different from the first timing, a wireless-terminal-specific reference signal to the wireless terminals of the cell of the wireless base station and a control signal to the wireless terminals of the cell of the wireless base station, concurrently at different frequencies; and a wireless terminal that based on the wireless-terminal-specific reference signal transmitted by the wireless base station, demodulates the control signal transmitted by the wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting one example of a communications system according to an embodiment;

FIG. 2 is a diagram depicting one example of a downlink radio resource;

FIG. 3A is a diagram depicting one example of a structure of a communications unit of a wireless base station;

FIG. 3B is a diagram depicting one example of signal flow in the communications unit of the wireless base station depicted in FIG. 3A;

FIG. 4A is a diagram depicting one example of a structure of a communications unit of a wireless terminal;

FIG. 4B is a diagram depicting one example of signal flow in the communications unit of the wireless terminal depicted in FIG. 4A;

DESCRIPTION OF EMBODIMENTS

Figure 5:
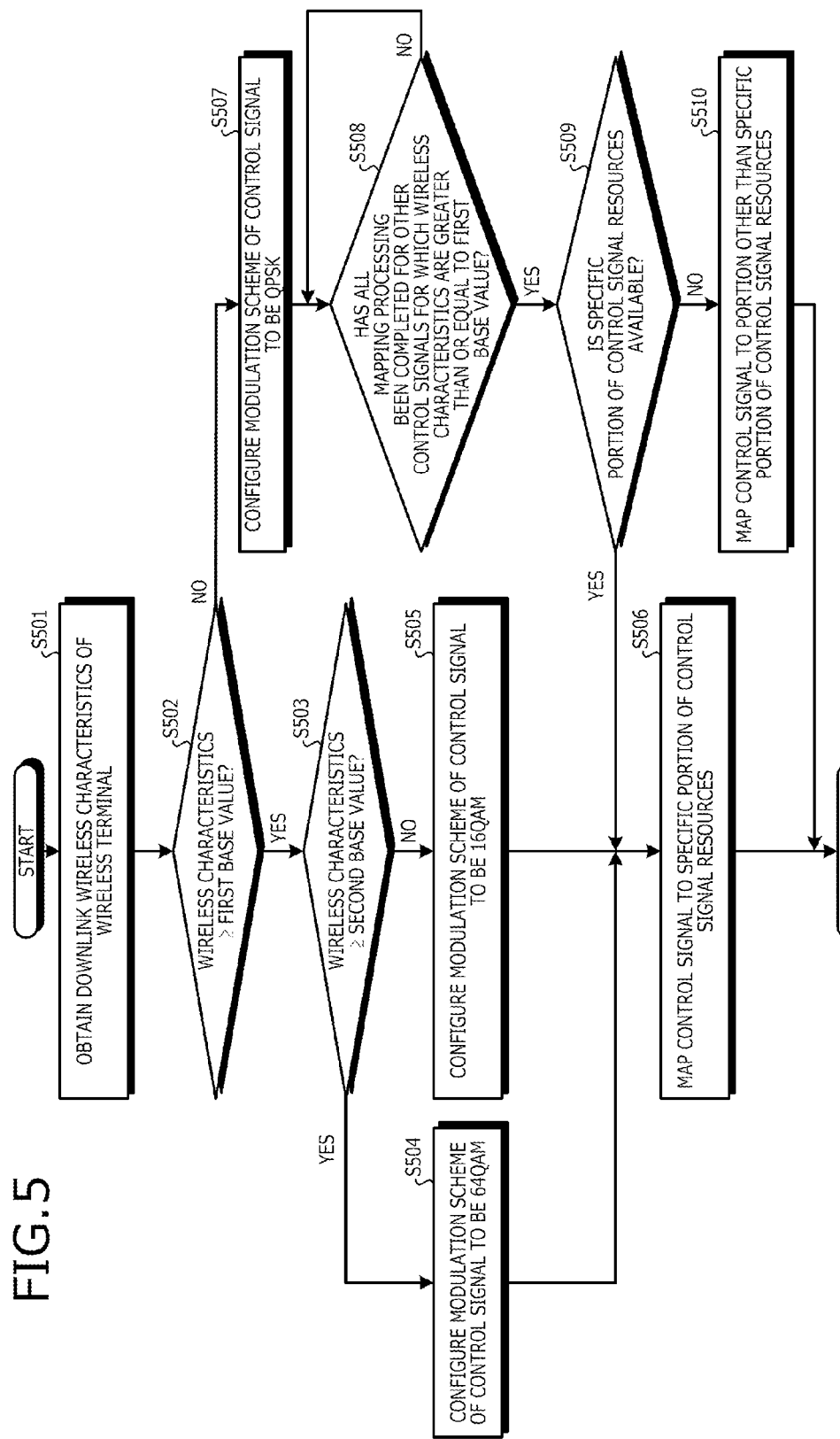
FIG. 5 is a flowchart depicting an example of operation of an arrangement selecting unit of the wireless base station.

An embodiment of a communications system, a wireless base station, a wireless terminal, and a communications method will be described in detail with reference to the accompanying drawings.

FIG. 1 is a diagram depicting one example of a communications system according to the embodiment. As depicted in FIG. 1, a communications system 100 includes wireless base stations 111, 112, and wireless terminals 131, 132. A cell 121 is the cell of the wireless base station 111; and a cell 122 is the cell of the wireless base station 112.

The wireless terminal 131 is located in the cell 121 and connected to the wireless base station 111. However, the wireless terminal 131 is also in the cell 122 and subject to interference by a wireless signal transmitted from the wireless base station 112. The wireless terminal 132 is located in the cell 122 and connected to the wireless base station 112.

The wireless base station 111 transmits downlink wireless signals to the wireless terminal 131. The wireless base station 112 transmits downlink wireless signals to the wireless terminal 132. Orthogonal frequency division multiplexing (OFDM) can be used with respect to the wireless signals transmitted by the wireless base stations 111, 112.

A signal map 141 depicts the signal map of wireless signals transmitted in the cell 121 by the wireless base station 111. A signal map 142 depicts the signal map of wireless signals transmitted in the cell 122 by the wireless base station 112. In the signal maps 141, 142, "C" represents a radio resource to which a downlink common reference signal is mapped. "D" represents a radio resource to which a downlink wireless-terminal-specific reference signal is mapped. Further, an x mark represents a radio resource to which a downlink control signal is mapped.

The common reference signal and the wireless-terminal-specific reference signal, for example, are symbols used for wireless communication synchronization and channel equalization; and are signals transmitted by the wireless base stations 111, 112 at a given cycle, to the respective cells thereof. The common reference signal is a reference signal commonly transmitted to wireless terminals in a cell. The wireless-terminal-specific reference signal is a reference signal discriminately transmitted to a wireless terminal in a cell.

In the communications system 100, for each cell, a frequency shift is performed on the frequency, which is based on the identification information of the cell and which is the frequency at which a common reference signal is transmitted to wireless terminals in the cell, at a first timing t1. For example, the identification information of the wireless base stations 111, 112 is assumed to be identification information #1, #2, respectively. Further, frequencies based on the identification information #1, #2 are assumed to be frequencies f1, f2 (f1≠f2), respectively.

In this case, at the first timing t1, the wireless base station 111 transmits a common reference signal at the frequency f1, which is based on the identification information #1 of the cell of the wireless base station 111. Meanwhile, the wireless base station 112 transmits at the same first timing t1 as the wireless base station 111, a common reference signal at the frequency f2, which is based on the identification information #2 of the cell of the wireless base station 112.

Further, at a second timing t2 that differs from the first timing t1, the wireless base station 111 transmits a wireless-terminal-specific reference signal to a wireless terminal in the cell thereof (e.g., the wireless terminal 131) and concurrently transmits a control signal to a wireless terminal in the cell thereof, at respectively different frequencies. More specifically, the wireless base station 112 transmits wireless-terminal-specific reference signals to a wireless terminal in the cell thereof at the frequencies f1, f3. Further, the wireless base station 111 transmits a control signal to a wireless terminal (e.g., the wireless terminal 132) in the cell thereof at the frequency f2.

Thus, the wireless base station 111 transmits a downlink control signal at the second timing t2 that differs from the first timing t1 at which a common reference signal is transmitted in the cells. As a result, even if a common reference signal is transmitted at some frequency in adjacent cells of the cell 122, interference of the control signal of the cell 122 by the common reference signal of an adjacent cell can be suppressed. Therefore, control signal reception characteristics at the wireless terminal 131 can be improved.

Further, the second timing t2 at which a control signal is transmitted to the wireless terminal 131 is also the timing at which a wireless-terminal-specific reference signal is transmitted to the wireless terminal 131. As a result, channel characteristics of the wireless-terminal-specific reference signal and the control signal received by the wireless terminal 131 become close and demodulation accuracy of the control signal that is based on channel estimation results of the wireless-terminal-specific reference signal is improved. Therefore, control signal reception characteristics at the wireless terminal 131 can be improved.

In the example depicted in FIG. 1, description of a case where the cells 121, 122 are formed by the wireless base stations 111, 112, respectively, is given. Nonetheless, the cells 121, 122 may be cells (sectors) formed by one wireless base station. Further, the communications system 100 may include three or more cells.

Further, in the example depicted in FIG. 1, description of a case where a control signal and a wireless-terminal-specific reference signal are concurrently transmitted in the cell 121 is given. Nonetheless, a control signal and a wireless-terminal-specific reference signal may be concurrently transmitted in the cell 122 as well. As a result, control signal reception characteristics in the wireless terminal 132 can also be improved.

FIG. 2 is a diagram depicting one example of a downlink radio resource. A physical resource block 200 depicted in FIG. 2, for example, is one physical resource block (PRB) in a wireless downlink interval of the cell 121.

Along the vertical axis of the physical resource block 200, time resources in units of 1-ms subframes are indicated. One subframe includes 14 (or 12) OFDM symbols. Along the horizontal axis of the physical resource block 200, frequency resources in units of 12 subcarriers are indicated.

In the physical resource block 200, in the head N OFDM symbols (head interval SF1), a response signal (e.g., ACK or NACK) for an uplink data signal and/or a downlink control signal are arranged. The downlink control signal includes, for example, notification information of a downlink data signal, instruction information for transmission of an uplink data signal, etc.

For the downlink control signal, for example, a physical downlink control channel (PDCCH) is used. A PDCCH is a downlink control signal of the physical layer (Layer 1) level and includes information related to data signal transmission.

A parameter related to the transmission of a data signal is stored in a downlink control signal correlated with the data signal and using a downlink subframe of the same data signal, is transmitted to a wireless terminal. The parameter related to the transmission of the data signal, for example, is information indicating the portion of the frequency domain by which a data signal is to be transmitted to the wireless terminals, the modulation scheme and/or the code rate applied to the data signal, and a hybrid automatic repeat request (HARQ) parameter related to data transmission.

A common reference signal for demodulation of the downlink control signal and data signal is used. The position (subcarrier) on the frequency axis of the common reference signal is frequency shifted based on a value uniquely determined by a value of the identification information (identification number) of the cell that transmits the common reference signal. As a result, collisions of common reference signals between adjacent cells can be prevented from occurring. The identification information of a cell, for example, is a physical cell ID (PCI).

In the example depicted in FIG. 2, although N=3, N may be 1 or 2. Further, the value of N may be a value that differs for each downlink subframe. The value of N, for example, is notified from the wireless base station 111 to the wireless terminal 131 by using a control signal such as a physical control format indicator channel (PCFICH) transmitted on the head OFDM symbol of the downlink subframe.

In the physical resource block 200, "C" represents a resource element to which a common reference signal is mapped. "D" represents a resource element to which a wireless-terminal-specific reference signal is mapped. "d" represents a resource element to which a data signal such as a physical downlink shared channel (PDSCH) is mapped.

In portions other than the head interval SF1 of the physical resource block 200, downlink data signals such as a PDSCH are mapped. Control information of an upper layer (e.g., Layer 2 or Layer 3) level is stored in the data signal and transmitted. A downlink control signal under LTE is subject to QPSK, etc. as a modulation scheme, and using a transmit diversity scheme, is transmitted from a transmission antenna of the wireless base station.

An enhanced-physical downlink control channel (E-PDCCH) is a downlink control signal mapped to and transmitted by a portion other than the head interval SF1 of the physical resource block 200. As a result, the capacity of a radio resource to which a downlink control signal can be mapped can be expanded. Further, the interference control technique between cells can be applied to not only data signals, but also downlink control signals.

Further, an E-PDCCH can be subject to a high-order modulation scheme or a spatial multiplexing scheme. A high-order modulation scheme is, for example, quadrature phase shift keying (QPSK), quadrature amplitude modulation (16 QAM), 64 QAM, and 256 QAM. A spatial multiplexing scheme is, for example, multiple input multiple output (MIMO). As a result, an E-PDCCH can be transmitted by fewer radio resources and therefore, a decrease in the capacity of radio resources to which a data signal can be mapped can be suppressed.

In the demodulation of an E-PDCCH, a wireless-terminal-specific reference signal is used, not a common reference signal. Therefore, for each wireless terminal or for each E-PDCCH, a different interantenna spatial matrix can be computed.

Resource elements 211 to 214 appended with an x mark represent a resource element to which an E-PDCCH is mapped. As indicated by the resource elements 211 to 214, subframes SF2 SF3 to which an E-PDCCH is mapped, are time resources to which a common channel signal in the cell is not mapped. As a result, irrespective of which becomes a frequency resource of a common reference signal of an adjacent cell consequent to an application of a frequency shift, interference of the E-PDCCH by the common reference signal from an adjacent cell can be prevented.

The subframes SF2 SF3 to which an E-PDCCH is mapped are time resources to which a wireless-terminal-specific reference signal in the cell is commonly mapped. Subcarriers SC1, SC2 to which an E-PDCCH is mapped, are frequency resources that are different from the frequency resources to which a wireless-terminal-specific reference signal in the cell is mapped.

As a result, the same time resource of an E-PDCCH is also the time resource of a wireless-terminal-specific reference signal and the accuracy of channel estimation for an E-PDCCH based on a wireless-terminal-specific reference signal can be improved. Therefore, even if an E-PDCCH is subject to a high-order modulation scheme, such as 16 QAM, 64QAM, etc., or a spatial multiplexing transmission scheme, the demodulation characteristics of the E-PDCCH can be improved.

Further, the wireless base station 111 can map a wireless-terminal-specific reference signal and a portion of a control signal (e.g., E-PDCCH) to an adjacent frequency and transmit the wireless-terminal-specific reference signal and the portion of the control signal. As a result, the accuracy of channel estimation for an E-PDCCH based on a wireless-terminal-specific reference signal can be improved.

In the cells, wireless-terminal-specific reference signals are not subject to frequency shifting. Therefore, in a cell, by staggering the frequency resources of the E-PDCCH and the wireless-terminal-specific reference signal, interference of the E-PDCCH by the wireless-terminal-specific reference signal of an adjacent cell can be prevented.

Thus, the wireless base station 111 can map an E-PDCCH to the resource elements 211 to 214, which are not affected by interference by a common reference signal or a wireless-terminal-specific reference signal from an adjacent cell. As a result, the reception characteristics of a downlink control signal by an E-PDCCH at the wireless terminal 131 can be improved.

According to the example depicted in FIG. 2, there are 24 of the resource elements 211 to 214 for an E-PDCCH in the physical resource block 200. For example, when an E-PDCCH is subject to 16 QAM, information bits after 96-bit-length encoding are mapped to the 24 resource elements 211 to 214 and become transmittable.

Under LTE, the size of a PDCCH includes four types, the smallest of which has been shown by analysis results to be used at the highest frequency. By the smallest PDCCH, information bits after 72-bit-length encoding are transmitted and one downlink control signal subject to 16 QAM can be mapped to the 24 resource elements 211 to 214.

Further, the interval of domains to which a wireless-terminal-specific reference signal is mapped, may be about ½ of the coherence bandwidth. For example, in the physical resource block 200 depicted in FIG. 2, the interval of domains to which a wireless-terminal-specific reference signal is mapped, is three subcarriers.

FIG. 3A is a diagram depicting one example of a structure of a communications unit of the wireless base station. FIG. 3B is a diagram depicting one example of signal flow in the communications unit of the wireless base station depicted in FIG. 3A. As depicted in FIGS. 3A and 3B, the wireless base station 111 includes an encoding unit 301, a modulating unit 302, an arrangement selecting unit 303, an encoding unit 304, a modulating unit 305, an encoding unit 306, a modulating unit 307, a frequency multiplexing unit 308, and a time division multiplexing unit 309. Further, the wireless base station 111 includes a wireless transmitting unit 310, a transmission antenna 311, a reception antenna 312, a wireless receiving unit 313, a reference signal processing unit 314, a demodulating unit 315, a decoding unit 316, and a control signal extracting unit 317.

The encoding unit 301 encodes an input data signal. The encoding unit 301 transmits the encoded data signal to the modulating unit 302. The modulating unit 302 modulates the data signal output from the encoding unit 301. The modulating unit 302 transmits the modulated data signal to the frequency multiplexing unit 308.

The arrangement selecting unit 303 selects a domain to arrange (map) an input control signal. The arrangement selecting unit 303 selects the domain based on DL_wireless characteristics information output from the control signal extracting unit 317. Based on the domain selection result, the arrangement selecting unit 303 outputs the input control signal to the encoding units 304, 306.

More specifically, the arrangement selecting unit 303 outputs to the encoding unit 304, the control signal that has been mapped to the same time domain as the data signal; and outputs to the encoding unit 306, the control signal that has been mapped to a time domain different from that of the data signal. Further, the arrangement selecting unit 303 configures the modulation scheme for the control signal, based on the DL_wireless characteristics information. Operation of the arrangement selecting unit 303 will be described hereinafter (for example, refer to FIG. 5).

The encoding units 304, 306 respectively encode the control signal output from the arrangement selecting unit 303. The encoding units 304, 306 respectively output the encoded control signals to the modulating units 305, 307. The modulating units 305, 307 respectively modulate the control signals output from the encoding units 304, 306. The modulating units 305, 307 respectively output the modulated control signals to the frequency multiplexing unit 308 and the time division multiplexing unit 309.

The frequency multiplexing unit 308 frequency multiplexes the data signal output from the modulating unit 302 and the control signal output from the modulating unit 305. The frequency multiplexing unit 308 outputs the frequency multiplexed signal to the time division multiplexing unit 309.

The time division multiplexing unit 309 time division multiplexes the signal output from the frequency multiplexing unit 308 and the control signal output from the modulating unit 307. The time division multiplexing unit 309 outputs the time division multiplexed signal to the wireless transmitting unit 310. Via the transmission antenna 311, the wireless transmitting unit 310 wirelessly transmits to the wireless terminal of the cell 121, the signal output from the time division multiplexing unit 309.

Via the reception antenna 312, the wireless receiving unit 313 receives signals wirelessly transmitted from the wireless terminal of the cell 121. The wireless receiving unit 313 outputs a received signal to the reference signal processing unit 314 and the demodulating unit 315.

The reference signal processing unit 314 extracts a reference signal that is included in the signal output from the wireless receiving unit 313, and outputs the extracted reference signal to the demodulating unit 315. Based on the reference signal output from the reference signal processing unit 314, the demodulating unit 315 demodulates the signal output from the wireless receiving unit 313. The demodulating unit 315 outputs the demodulated signal to the decoding unit 316.

The decoding unit 316 decodes the signal output from the demodulating unit 315. The decoding unit 316 outputs a data signal and a control signal included in the decoded signal. The control signal output from decoding unit 316 is input to the control signal extracting unit 317.

The control signal extracting unit 317 outputs the control signal output from the decoding unit 316. Further, the control signal extracting unit 317 extracts DL_wireless characteristics information included in the control signal output from the decoding unit 316. The control signal extracting unit 317 outputs the extracted DL_wireless characteristics information to the arrangement selecting unit 303.

FIG. 4A is a diagram depicting one example of a structure of a communications unit of the wireless terminal. FIG. 4B is a diagram depicting one example of signal flow in the communications unit of the wireless terminal depicted in FIG. 4A. As depicted in FIGS. 4A and 4B, the wireless terminal 131 includes a reception antenna 401, a wireless receiving unit 402, a reference signal processing unit 403, a wireless characteristics measuring unit 404, a time division demultiplexing unit 405, a control signal detecting/demodulating/decoding unit 406, and a frequency demultiplexing unit 407. The wireless terminal 131 further includes a control signal detecting/demodulating/decoding unit 408, a data signal demodulating/decoding unit 409, an encoding unit 410, a modulating unit 411, an encoding unit 412, a modulating unit 413, a switching unit 414, a wireless transmitting unit 415, and a transmission antenna 416.

The wireless receiving unit 402 receives via the reception antenna 401, signals wirelessly transmitted from the wireless base station 111. The wireless receiving unit 402 outputs a received signal to the reference signal processing unit 403 and the time division demultiplexing unit 405.

The reference signal processing unit 403 extracts a reference signal that is included in the signal output from the wireless receiving unit 402. The reference signal processing unit 403 outputs the extracted reference signal to the wireless characteristics measuring unit 404, the control signal detecting/demodulating/decoding unit 406, the control signal detecting/demodulating/decoding unit 408, and the data signal demodulating/decoding unit 409.

Based on the reference signal output from the reference signal processing unit 403, the wireless characteristics measuring unit 404 measures the downlink wireless characteristics from the wireless base station 111 to the wireless terminal 131. The signal to interference and noise ratio (SINR), etc., for example, can be used as the wireless characteristics measured by the wireless characteristics measuring unit 404. The wireless characteristics measuring unit 404 outputs to the encoding unit 410, DL_wireless characteristics information that indicates the measured downlink wireless characteristics.

The time division demultiplexing unit 405 time division demultiplexes the signal output from the wireless receiving unit 402. The time division demultiplexing unit 405 outputs each of the signals obtained by the time division demultiplexing, to the control signal detecting/demodulating/decoding unit 406 and the frequency demultiplexing unit 407, respectively. More specifically, among the obtained signals, the time division demultiplexing unit 405 outputs to the control signal detecting/demodulating/decoding unit 406, a signal of a frequency to which only a control signal is mapped. Further, among the obtained signals, the time division demultiplexing unit 405 outputs to the frequency demultiplexing unit 407, a signal of a frequency to which a data signal and a control signal are mapped.

Based on the reference signal output from the control signal detecting/demodulating/decoding unit 406, the reference signal processing unit 403 detects a control signal from the signal output from the time division demultiplexing unit 405 and, demodulates and decodes the detected control signal. The control signal detecting/demodulating/decoding unit 406 outputs the decoded control signal. The control signal output from the control signal detecting/demodulating/decoding unit 406 is input to the data signal demodulating/decoding unit 409.

The frequency demultiplexing unit 407 frequency demultiplexes the signal output from the time division demultiplexing unit 405. The frequency demultiplexing unit 407 outputs to the control signal detecting/demodulating/decoding unit 408, a control signal obtained by the frequency demultiplexing. Further, the frequency demultiplexing unit 407 outputs to the data signal demodulating/decoding unit 409, a data signal obtained by the frequency demultiplexing.

Based on the reference signal output from the reference signal processing unit 403, the control signal detecting/demodulating/decoding unit 408 detects the control signal output from the frequency demultiplexing unit 407 and, demodulates and decodes the detected control signal. The control signal detecting/demodulating/decoding unit 408 outputs the decoded control signal. The control signal output from the control signal detecting/demodulating/decoding unit 408 is input to the data signal demodulating/decoding unit 409.

The data signal demodulating/decoding unit 409 demodulates and decodes the data signal output from the frequency demultiplexing unit 407. More specifically, the data signal demodulating/decoding unit 409 performs the demodulation and decoding based on the reference signal output from the reference signal processing unit 403 and the control signals output from the control signal detecting/demodulating/decoding units 406, 408. The data signal demodulating/decoding unit 409 outputs the decoded data signal.

The encoding unit 410 encodes the input control signal. The encoding unit 410 further stores to the control signal to be encoded, the DL_wireless characteristics information output from the wireless characteristics measuring unit 404. The encoding unit 410 outputs the encoded control signal to the modulating unit 411.

The modulating unit 411 modulates the control signal output from the encoding unit 410. The modulating unit 411 outputs the modulated control signal to the switching unit 414. The encoding unit 412 encodes the input data signal. The encoding unit 412 outputs the encoded data signal to the modulating unit 413. The modulating unit 413 modulates the data signal output from the encoding unit 412. The modulating unit 413 outputs the modulated data signal to the switching unit 414.

The switching unit 414 switches between outputting to the wireless transmitting unit 415, the control signal output from the modulating unit 411 and the data signal output from the modulating unit 413. Via the transmission antenna 416, the wireless transmitting unit 415 wirelessly transmits to the wireless base station 111, the signal output from the switching unit 414.

FIG. 5 is a flowchart depicting an example of operation of the arrangement selecting unit of the wireless base station. The arrangement selecting unit 303 of the wireless base station 111, for example, executes the following steps with respect to a downlink to the wireless terminal 131. The arrangement selecting unit 303 obtains the downlink wireless characteristics of the wireless terminal 131 (step S501). The downlink wireless characteristics of the wireless terminal 131, for example, can be obtained from the DL_wireless characteristics information included in a control signal received from the wireless terminal 131.

The arrangement selecting unit 303 determines if the wireless characteristics obtained at step S501 are at least a first base value (step S502). If the wireless characteristics are greater than or equal to the first base value (step S502: YES), the arrangement selecting unit 303 determines if the wireless characteristics are at least a second base value (step S503). The second base value is greater than the first base value.

At step S503, if the wireless characteristics are greater than or equal to the second base value (step S503: YES), the arrangement selecting unit 303 configures the modulation scheme of the control signal to be 64 QAM (step S504), and transitions to step S506. If the wireless characteristics are less than the second base value (step S503: NO), the arrangement selecting unit 303 configures the modulation scheme of the control signal to be 16 QAM (step S505).

The arrangement selecting unit 303 maps the control signal to a specific portion of the control signal resources (step S506), and ends a series of mapping operations. The specific portion is a time when in the cells, no common reference signal is transmitted and a wireless-terminal-specific reference signal of the cell of the wireless base station is transmitted, and a radio resource of a frequency that differs from that of the wireless-terminal-specific reference signal. The specific portion, for example, is the resource elements 211 to 214 depicted in FIG. 2.

At step S502, if the wireless characteristics are less than the first base value (step S502: NO), the arrangement selecting unit 303 configures the modulation scheme of the control signal to be QPSK (step S507). The arrangement selecting unit 303 determines whether all mapping processing has been completed for other control signals for which the wireless characteristics are greater than or equal to the first base value (step S508), and stands by until all the mapping processing has been completed (step S508: NO).

At step S508, when all the mapping processing for the other control signals has been completed (step S508: YES), the arrangement selecting unit 303 determines whether the specific portion of the control signal resources is available (step S509). If any of the specific portion is available (step S509: YES), the arrangement selecting unit 303 transitions to step S506.

At step S509, if none of the specific portion is available (step S509: NO), the arrangement selecting unit 303 maps the control signal to a portion other than the specific portion of control signal resources (step S510), and ends a series of mapping operations. A portion other than the specific portion, for example, is a radio resource of the time when in the cells, a common reference signal is transmitted; a radio resource of the time when in the cells, no common reference signal is transmitted and the wireless-terminal-specific reference signal of the cell of the wireless base station is also not transmitted.

By the operations above, the arrangement selecting unit 303 configures based on the DL_wireless characteristics information, the modulating scheme performed on the control signal by the modulating unit 307. Further, the arrangement selecting unit 303 preferentially maps a control signal that has been subject to, for example, 64 QAM or 16 QAM, which are higher order modulation schemes compared to QPSK and can suppress deterioration of the reception characteristics of a control signal subject to a higher order modulation scheme.

Thus, the wireless base station 111 transmits a control signal, using a modulation scheme according to the wireless characteristics between the wireless base station 111 and the wireless terminal 131. The higher the order of the modulation scheme used for a control signal, the more preferentially the wireless base station 111 transmits the control signal by a radio resource of the same time as the wireless-terminal-specific reference signal during the second timing when no common reference signal is transmitted. As a result, a high-order modulation scheme can be used on a control signal for the wireless terminal 131 that has favorable wireless characteristics, resource utilization efficiency is improved, and deterioration of the reception characteristics of the control signal can be suppressed.

Figure 6:
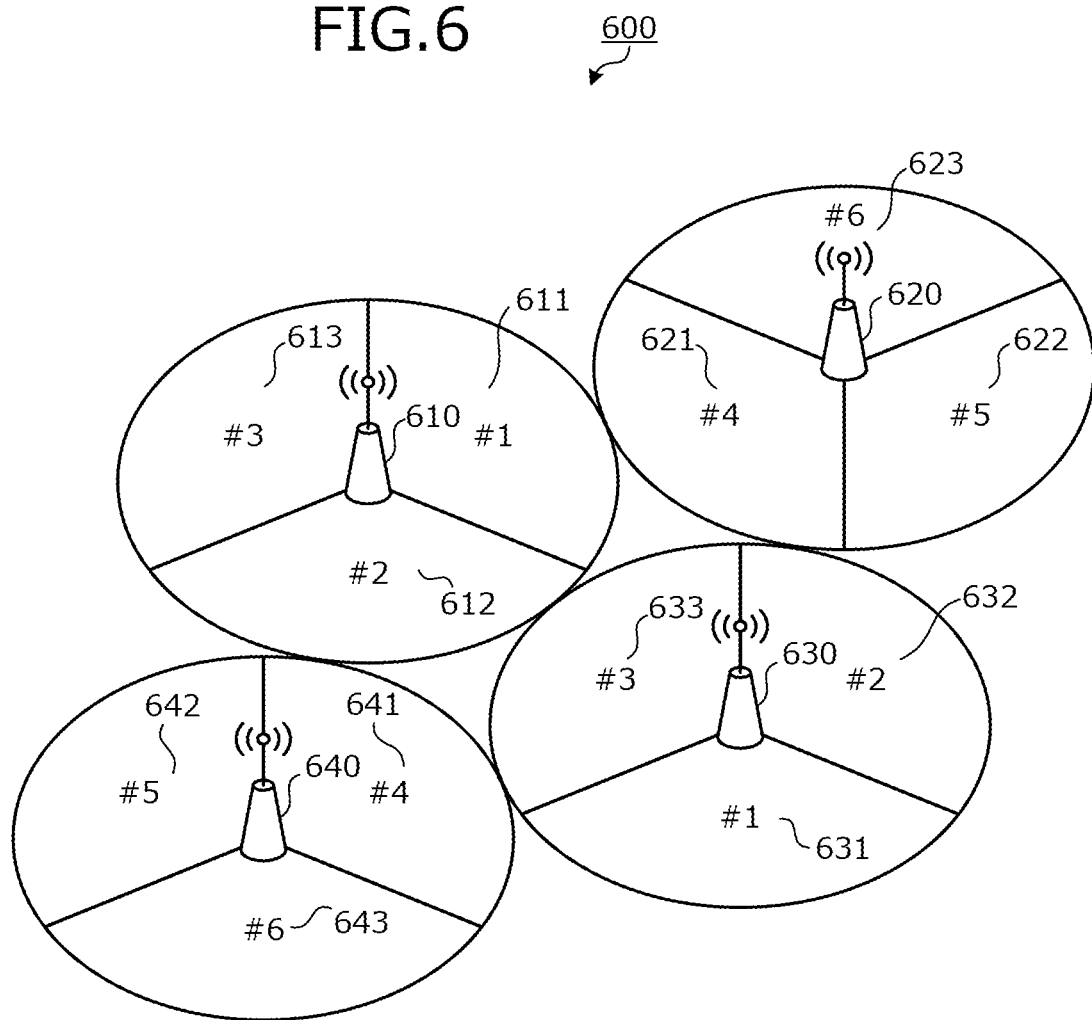
FIG. 6 is a diagram depicting one example of cell arrangement.
Figure 7A:
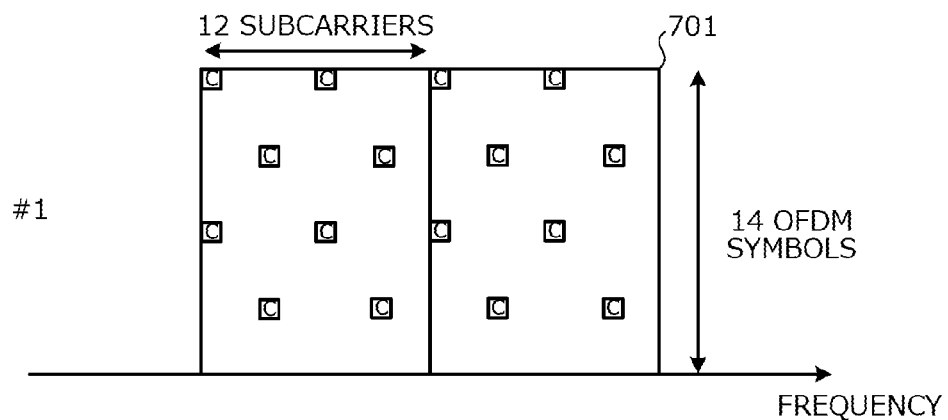
FIG. 7A is a diagram depicting one example of frequency shifting of a common reference signal.
Figure 7B:
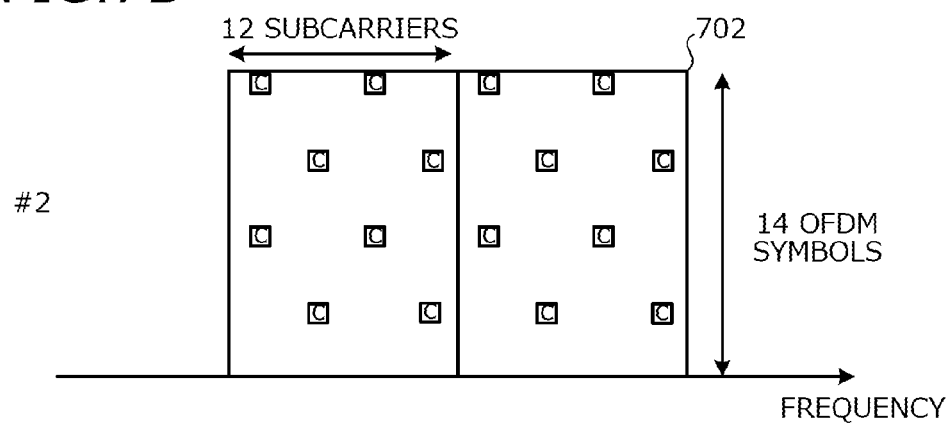
FIG. 7B is a diagram depicting one example of frequency shifting of the common reference signal.
Figure 7C:
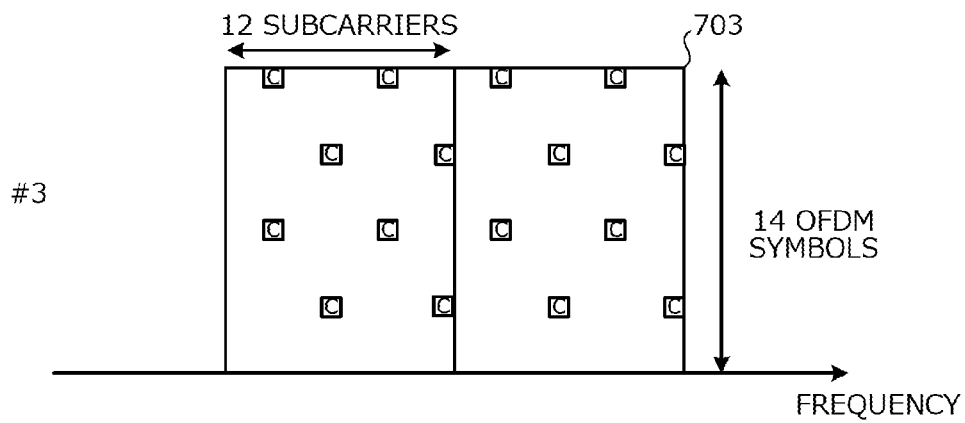
FIG. 7C is a diagram depicting one example of frequency shifting of the common reference signal.
Figure 7D:
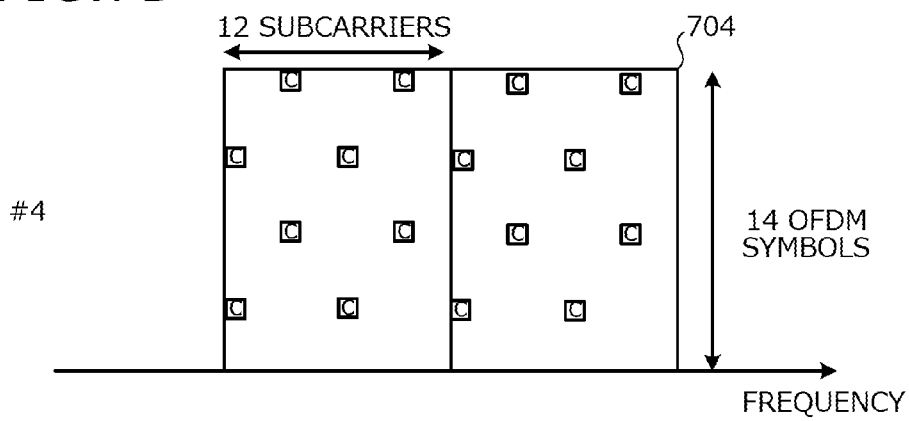
FIG. 7D is a diagram depicting one example of frequency shifting of the common reference signal.
Figure 7E:
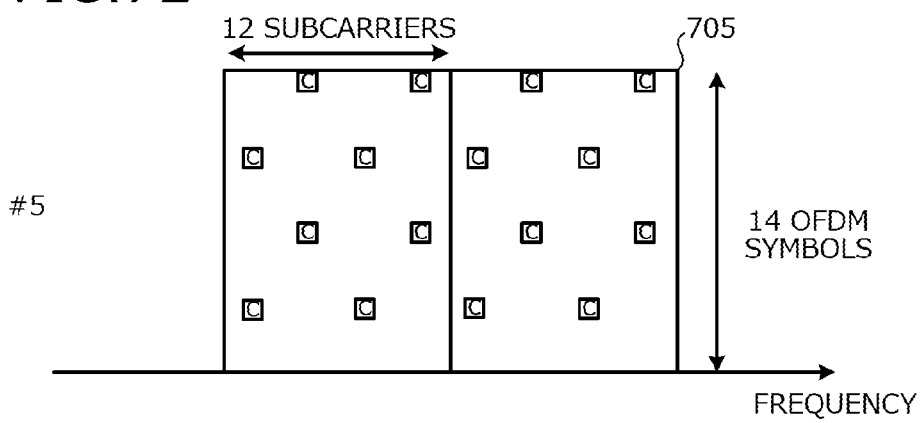
FIG. 7E is a diagram depicting one example of frequency shifting of the common reference signal.
Figure 7F:
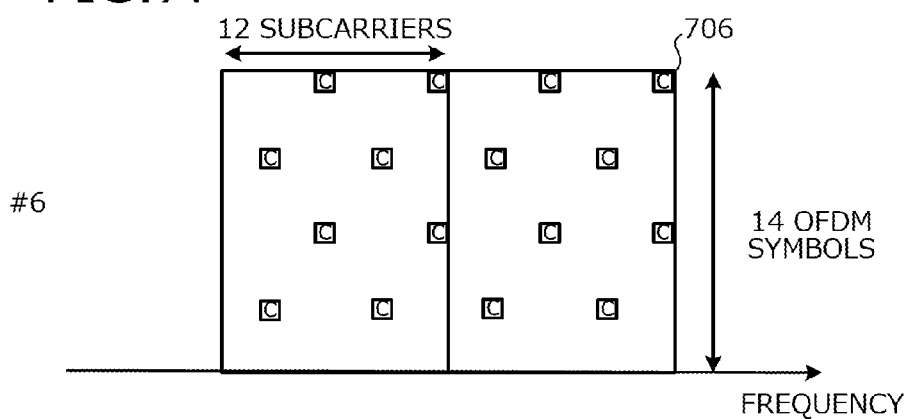
FIG. 7F is a diagram depicting one example of frequency shifting of the common reference signal.

FIG. 6 is a diagram depicting one example of cell arrangement. A communications system 600 depicted in FIG. 6 includes the wireless base stations 610, 620, 630, 640. The wireless base station 610 forms cells 611 to 613 respectively of the identification information #1 to #3. A wireless base station 620 forms cells 621 to 623 respectively of identification information #4 to #6. A wireless base station 630 forms cells 631 to 633 respectively of the identification information #1 to #3. A wireless base station 640 for cells 641 to 643 respectively of identification information #4 to #6.

FIGS. 7A, 7B, 7C, 7D, 7E, and 7F are diagrams depicting one example of frequency shifting of the common reference signal. Physical resource blocks 701 to 706 depicted in FIGS. 7A to 7F represent downlink physical resource blocks of the cells respectively of the identification information #1 to #6. For example, the physical resource block 701 represents a physical resource block of the cells 611, 631 depicted in FIG. 6. The physical resource block 702 represents a physical resource block of the cells 612, 632 depicted in FIG. 6.

In the physical resource blocks 701 to 706, "C" represents a radio resource to which a common reference signal is mapped. The mapping of signals other than the common reference signal in the physical resource blocks 701 to 706 is not depicted.

As depicted by the physical resource blocks 701 to 706, the cells (the cells 611 to 613, 621 to 623, 631 to 633, 641 to 643) of the communications system 600 transmit a common reference signal by the same time resource. Further, in each of the cells of the communications system 600, the common reference signal is transmitted by a frequency resources based on the identification information of the cell.

For example, in the communications system 600, frequency resources are correlated with the remainder that results when the cell ID (identification information) is divided by 6. Each of the cells of the communications system 600 transmit a common reference signal by a frequency resource that corresponds to the remainder that results when the cell ID thereof is divided by 6.

Thus, in the cells of the communications system 600, by performing frequency shifting of the common reference signals, interference of common reference signals of adjacent cells can be suppressed. For example, although the cell 611 and the cell 621 are adjacent to each other, the common reference signals are transmitted at different frequencies based on the respective identification information #1, #4 and therefore, interference can be suppressed.

The wireless base station 111 above, for example, is applicable to at least any one of the wireless base stations 610, 620, 630, 640 of the communications system 600 depicted in FIG. 6. The wireless terminal 131 above, for example, is applicable to a wireless terminal located in at least any one of the cells of the communications system 600 depicted in FIG. 6.

The wireless base station 111 and the wireless terminal 131 are also applicable to the cells of a communications system in which small cells (e.g., femtocells) are present in a large cell (macrocell). In such a communications system, if a wireless terminal in the large cell is forcibly connected to a small cell to transfer the traffic load of the large cell to the small cell, the effects of the interference by the reference signal transmitted from the large cell, on the wireless terminal becomes great. Further, in such a communications system, there are multiple cell arrangements and therefore, control of intercell reference signal interference becomes difficult. In contrast, by an application of the wireless base station 111 and the wireless terminal 131, the effects of the interference from the reference signal can be suppressed.

Figure 8:
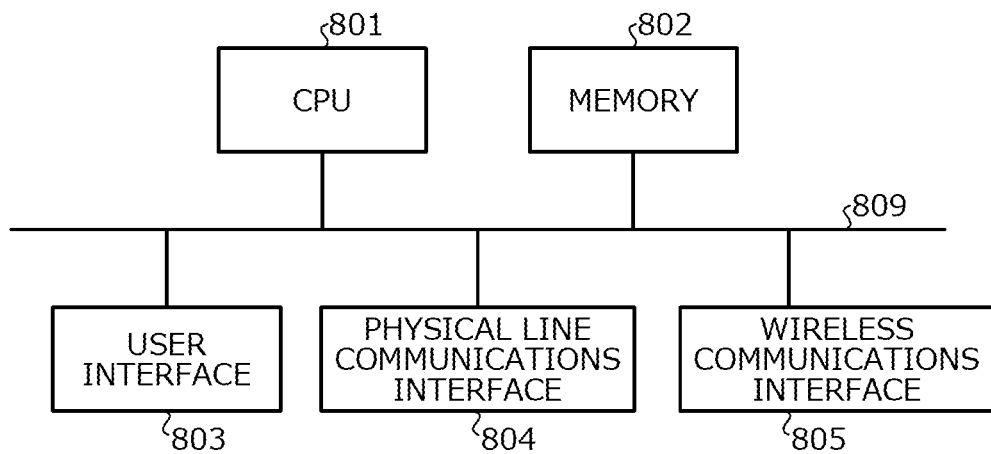
FIG. 8 is a diagram depicting one example of a hardware structure of the wireless base station.

FIG. 8 is a diagram depicting one example of a hardware structure of the wireless base station. The wireless base station 111, for example, can be realized by a communications apparatus 800 depicted in FIG. 8. The communications apparatus 800 includes a CPU 801, memory 802, a user interface 803, a physical line communications interface 804, and a wireless communications interface 805. The CPU 801, the memory 802, the user interface 803, the physical line communications interface 804, and the wireless communications interface 805 are connected by a bus 809.

The CPU 801 (central processing unit) governs overall control of the communications apparatus 800. The communications apparatus 800 may include the CPU 801 in plural. The memory 802 includes, for example, main memory and auxiliary memory. The main memory is, for example random access memory (RAM). The main memory is used as a work area of the CPU 801. The auxiliary memory is, for example, nonvolatile memory such as a magnetic disk, an optical disk, flash memory, etc. In the auxiliary memory, various programs that cause the communications apparatus 800 to operate are stored. The programs stored in the auxiliary memory are loaded to the main memory and executed by the CPU 801.

The user interface 803 includes, for example, an input device that receives operational input from a user, an output device that outputs information to the user, etc. The input device, for example, can be realized by keys (e.g., a keyboard), a remote controller, etc. The output device, for example, can be realized by a display, speaker, etc. Further, the input device and the output device may be realized by a touch panel and the like. The user interface 803 is controlled by the CPU 801.

The physical line communications interface 804 is a communications interface that performs communication with an external destination (e.g., a bearer network such as mobile communications network) of the communications apparatus 800, via a physical line. The physical line communications interface 804 is controlled by the CPU 801. The wireless communications interface 805 performs wireless communication with an external destination (e.g., the wireless terminal 131) of the communications apparatus 800. The wireless communications interface 805 is controlled by the CPU 801.

The wireless transmitting unit 310, the transmission antenna 311, the reception antenna 312, and the wireless receiving unit 313 depicted in FIGS. 3A and 3B, for example, can be realized by the wireless communications interface 805. The other processing units depicted in FIGS. 3A and 3B can be realized, for example, by the CPU 801.

Figure 9:
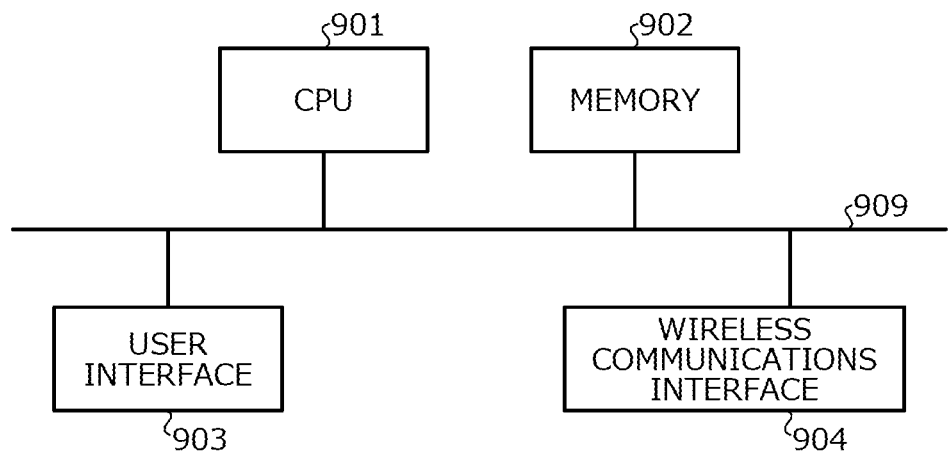
FIG. 9 is a diagram depicting one example of a hardware structure of the wireless terminals.

FIG. 9 is a diagram depicting one example of a hardware structure of the wireless terminals. The wireless terminal 131, for example, can be realized by a communications apparatus 900 depicted in FIG. 9. The communications apparatus 900 includes a CPU 901, memory 902, a user interface 903, and a wireless communications interface 904. The CPU 901, the memory 902, the user interface 903, and the wireless communications interface 904 are connected by a bus 909.

The CPU 901, the memory 902, the user interface 903, and the wireless communications interface 904 are respectively the same as the CPU 801, the memory 802, the user interface 803, and the wireless communications interface 805 depicted in FIG. 8. However, the wireless communications interface 904, for example, is a communications interface that performs wireless communication with an external destination (e.g., the wireless base station 111) of the communications apparatus 900.

The reception antenna 401, the wireless receiving unit 402, the wireless transmitting unit 415, and the transmission antenna 416 depicted in FIGS. 4A and 4B, for example, can be realized by the wireless communications interface 904. The other processing units depicted in FIGS. 4A and 4B, for example, can be realized by the CPU 901.

As described, according to the communications system, the wireless base station, the wireless terminal, and the communications method, common reference signals between cells are frequency shifted, and a downlink control signal can be transmitted at a time when no reference signal is transmitted and a wireless-terminal-specific reference signal is transmitted. As a result, interference can be suppressed, and the accuracy of channel estimation as well as control signal reception characteristics can be improved.

Therefore, for example, even when a high-order modulation scheme or spatial multiplexing transmission scheme is applied to the transmission of a downlink control signal, deterioration of the reception characteristics of the downlink control signal can be suppressed. Consequently, deterioration of the reception characteristics of the downlink control signal can be suppressed and the utilization efficiency of radio resources for the downlink control signal can be improved.

Further, even when the mapping interval of wireless-terminal-specific reference signals is small, the accuracy of channel estimation can be raised and therefore, a decrease in the radio resources to which a data signal can be mapped can be suppressed.

In addition, the accuracy of channel estimation can be raised without strong transmission power of the wireless-terminal-specific reference signal. As a result, even in cases where in the time domain, the transmission power when a radio symbol is transmitted is made constant, the accuracy of channel estimation can be improved without lowering the transmission power of a data signal transmitted on the same radio symbol. Therefore, deterioration of data signal reception characteristics can be suppressed.

According to one aspect, the effects of interference from a common reference signal from an adjacent wireless base station can be reduced. Further, by placing a wireless control signal in a vicinity of a reference signal used in demodulation, the reception characteristics of the wireless control signal can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications system comprising:
  a wireless base station comprising:
    a transmitter configured to transmit to a wireless terminal of a cell corresponding to the wireless base station a common reference signal at a first timing, at a frequency that is based on identification information of the cell, wherein the common reference signal mapping is restricted to a resource element other than a resource element where a common reference signal of an adjacent cell is mapped, and
    configured to concurrently transmit to the wireless terminal of the cell at a second timing that is different from the first timing, a wireless-terminal-specific reference signal and a control signal, the wireless-terminal-specific reference signal and the control signal at different frequencies, wherein the control signal is mapped to a resource element other than resource element to which the common reference signal is mapped, and wherein the second timing is a timing when the common reference signal of the adjacent cell is not transmitted; and
  the wireless terminal configured to demodulate the control signal transmitted by the wireless base station based on the wireless-terminal-specific reference signal transmitted by the wireless base station.

2. The communications system according to claim 1, wherein the wireless base station transmits the wireless-terminal-specific reference signal and the control signal on adjacent frequencies.

3. The communications system according to claim 1, wherein the wireless base station transmits the wireless-terminal-specific reference signal and a portion of the control signal on adjacent frequencies.

4. The communications system according to claim 1, wherein
  the wireless base station transmits a data signal to the wireless terminals of the cell corresponding to the wireless base station and transmits the control signal that includes a parameter related to transmission of the data signal, and
  the wireless terminal, based on a demodulation result of the control signal, receives the data signal transmitted by wireless base station.

5. The communications system according to claim 1, wherein the wireless base station transmits the control signal by spatial multiplexing transmission.

6. The communications system according to claim 1, wherein the wireless base station transmits the control signal modulated by any one among quadrature phase shift keying (QPSK), (16 QAM), 64 QAM, and 256 QAM.

7. A wireless base station of a communications system comprising a processing circuit and a memory configured to cause the execution of:

transmitting to a wireless terminal of a cell corresponding to the base station a common reference signal at a first timing at a frequency that is based on identification information of a cell, wherein the common reference signal mapping is restricted to a resource element other than a resource element where a common reference signal of an adjacent cell is mapped, and concurrently transmitting to the wireless terminal of the cell at a second timing that is different from the first timing, a wireless-terminal-specific reference signal and a control signal, the wireless-terminal-specific reference signal and the control signal transmitted at different frequencies, wherein the control signal is mapped to a resource element other than resource element to which the common reference signal is mapped, and wherein the second timing is a timing when the common reference signal of the adjacent cell is not transmitted.

8. The wireless base station according to claim 7, wherein the wireless base station transmits the wireless-terminal-specific reference signal and the control signal on adjacent frequencies.

9. The wireless base station according to claim 7, wherein the wireless base station transmits the wireless-terminal-specific reference signal and a portion of the control signal on adjacent frequencies.

10. A wireless terminal of a communications system comprising a processing circuit and a memory configured to cause the execution of:

receiving a common reference signal transmitted by a wireless base station at a first timing at a frequency that is based on identification information of a cell corresponding to the base station, wherein the common reference signal mapping is restricted to a resource element other than a resource element were a common reference signal of an adjacent cell is mapped, receiving a wireless-terminal-specific reference signal and a control signal both of which were concurrently transmitted by the wireless base at different frequencies, at a second timing that is different from the first timing, wherein the control signal is mapped to a resource element other than a resource element to which the common reference signal is mapped, and wherein the second timing is a timing when the common reference signal of the adjacent cell is not transmitted, and demodulating the received control signal, based on the received wireless-terminal-specific reference signal.

11. The wireless terminal according to claim 10, wherein the wireless-terminal-specific reference signal and the control signal are received on adjacent frequencies.

12. The wireless terminal according to claim 10, wherein the wireless-terminal-specific reference signal and a portion of the control signal are received on adjacent frequencies.

* * * * *